Patented June 9, 1942

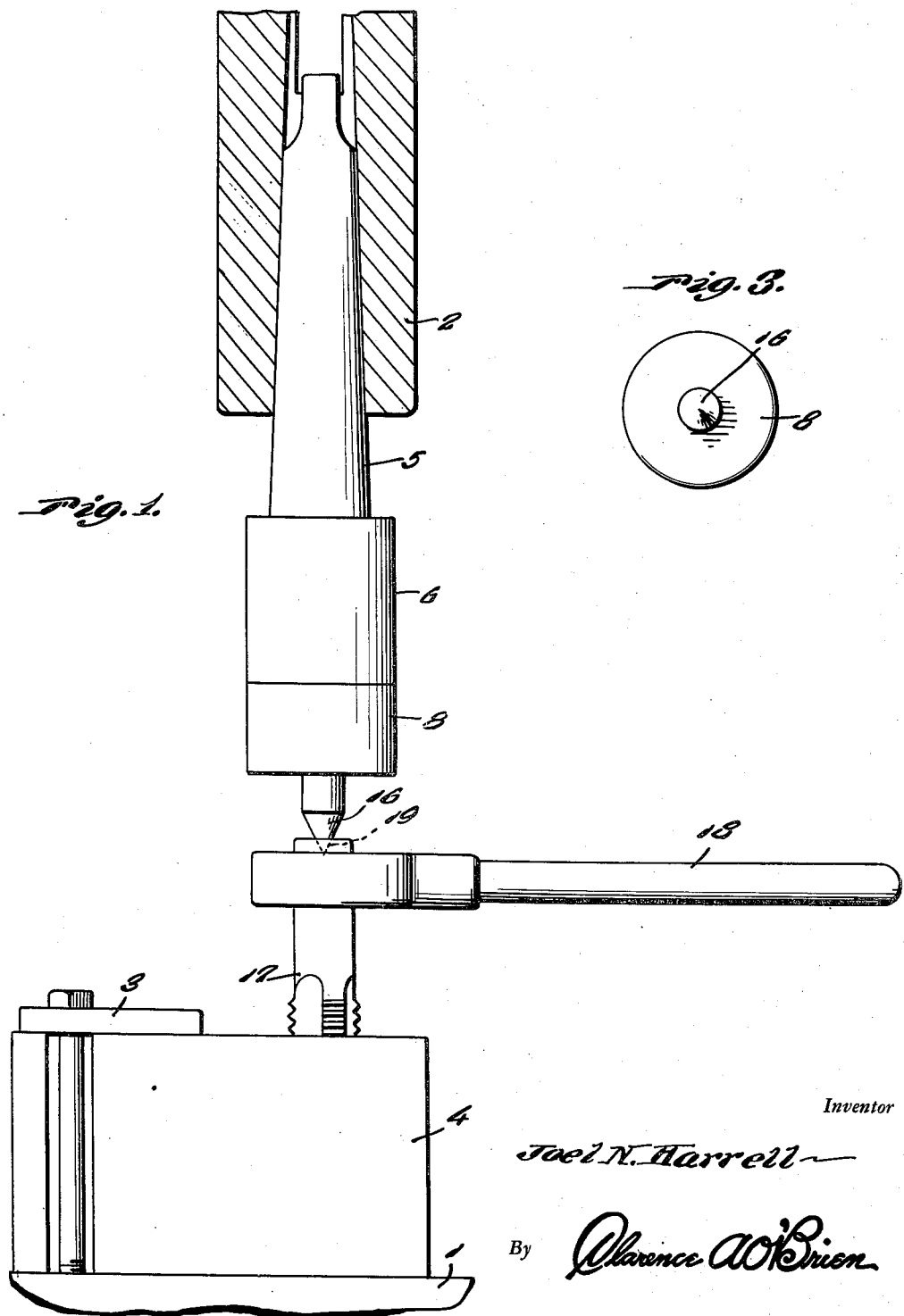

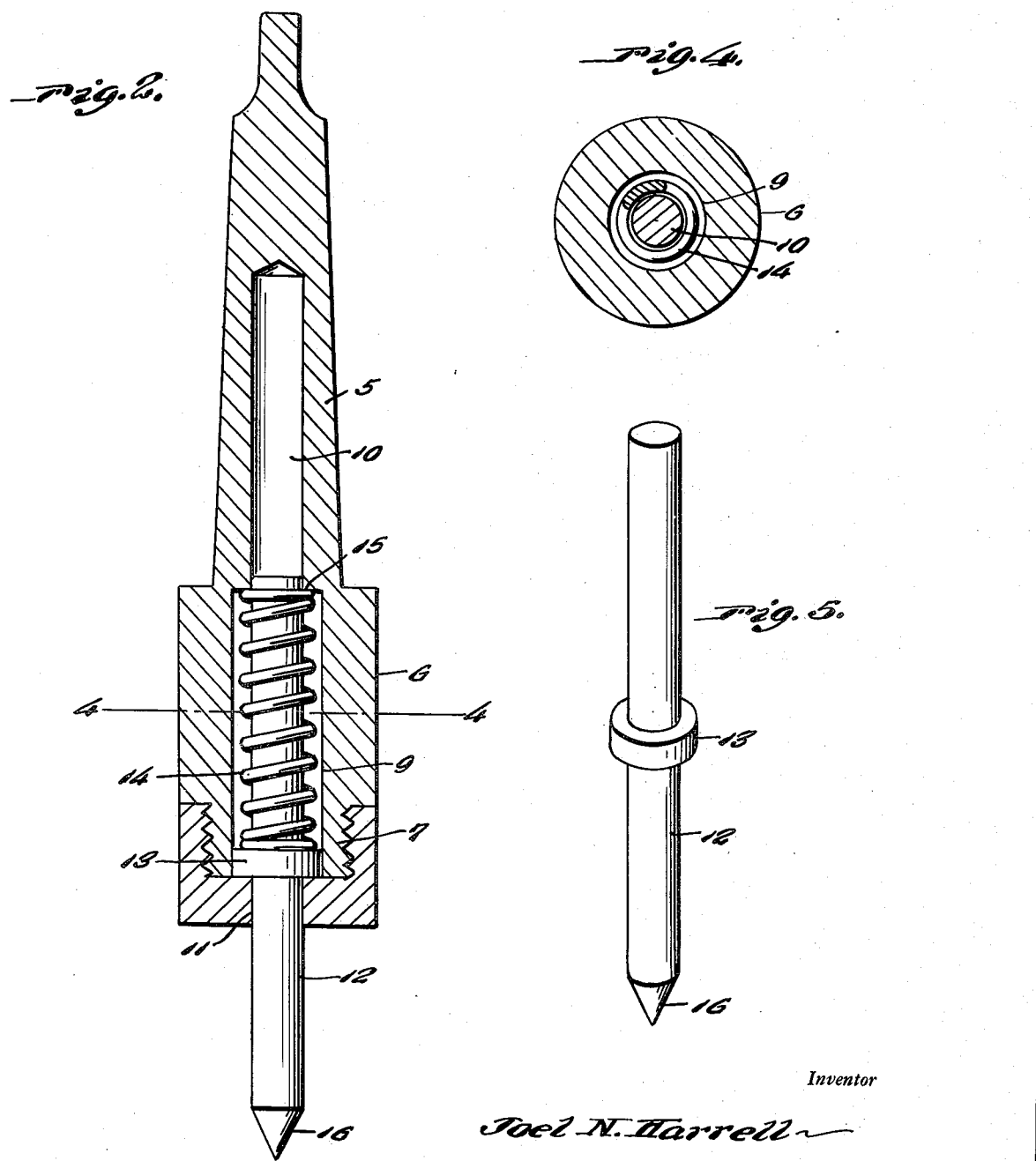

2,286,088

UNITED STATES PATENT OFFICE 2,286,088

CENTER FOR TAPPING TOOLS

Joel N. Harrell, Charleston, S. C.

Application December 4, 1941, Serial No. 421,654

1 Claim. (Cl. 10—135)

My invention relates to improvements in centers for use in drill presses and lathes, the primary object in view being to provide a simply constructed, efficient device of this character for use in such machine to maintain a tapping tool axially aligned during a tapping operation with a bore to be tapped, and in a manner such that shock and jar against the tool is obviated and consequently breaking of the tool, and the tapping operation is expedited.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 1 is a view in elevation, with parts shown in section, illustrating the preferred embodiment of my invention, Figure 2 is a view in longitudinal section of the center detached, Figure 3 is a view in end elevation of the center, Figure 4 is a view in transverse section taken on the line 4—4 of Figure 2, and Figure 5 is a view in perspective of the centering pin.

Reference being had to the drawings by numerals, my improved center has been shown therein, by way of exemplification, as forming part of the equipment of a drill press, 1 designating the table of the drill press, 2 the usual upwardly tapering drill chuck above the table 1, and 3 a suitable clamp for securing a piece of stock 4 on the table 1 in a position for the drilling of a bore to be tapped therethrough.

The center of my invention comprises a tapering shank 5 for insertion upwardly into the chuck 2 and provided at its larger end with an enlarged cylindrical head 6 having at the end thereof opposite the shank 5 a reduced externally threaded nipple 7. An internally threaded cap nut 8 is turned onto the nipple 7. The head 6 and nipple 7 are provided with an axial bore 9 of uniform diameter, the shank 5 with a counterbore 10 axially aligned with the bore 9, and the nut 8 with an aperture 11 of the same diameter as the counterbore 10 and axially aligned therewith and with the bore 9.

An elongated centering pin 12 is slidably mounted in the aperture 11 and counterbore 10 for advance and retraction, said pin, as will be understood, being of the same diameter substantially as the aperture 11 and counterbore 10.

A collar 13 on said pin 12 intermediate the ends thereof and slidably fitting in the bore 9 limits advance of the centering pin 12 by engagement of the same with the cap nut 8. A coil spring 14 sleeved onto the center pin 12 between the collar 13 and a shoulder 15 in the head 6 tends to advance said pin 12. The center pin 12 is provided with the usual pointed outer end 16.

Referring now to the use and operation of the described center, after the piece of stock 4 is drilled in the usual manner for tapping, the center of my invention is substituted for the drill, the usual tapping tool 17 started into the drilled bore, not shown, for operation as by the usual ratchet wrench 18, and the center pin 12 retracted in opposition to the coil spring 14 and then permitted to seat under the action of said spring in the usual socket 19 in the end of the tapping tool 17, it being understood that such positioning of the center pin 12 is manually effected. As will be clear, with the center pin 12 thus positioned relative to the tapping tool 17, the latter will be held axially aligned with the bore to be tapped during the tapping operation, the coil spring 14 causing the center pin to follow the tapping tool 17 as it is turned into the bore being tapped.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claim.

What I claim is:

A center for use in a drill chuck or head stock for holding a tapping tool aligned with a bore to be tapped comprising a tapered shank for insertion in said chuck, a cylindrical head on one end of said shank having a reduced threaded nipple on one end thereof, a cap nut threaded onto said nipple, said head having an axial bore therethrough and said shank a counterbore extending axially from said bore of the head and forming at its juncture with the latter an internal shoulder in said head, a centering pin slidable in said nut and counterbore for advance and retraction relative to said head, a collar on said pin within said bore for engaging said nut to limit advance of said pin, and a coil spring surrounding said pin in said bore and interposed between said collar and shoulder to yieldingly advance said pin.

JOEL N. HARRELL.